3,290,171
METHOD AND MATERIALS FOR METALLIZING
CERAMICS
James A. Zollman and Morris Berg, Lancaster, Pa., assignors to Radio Corporation of America, a corporation of Delaware
No Drawing. Filed Dec. 5, 1962, Ser. No. 242,367
6 Claims. (Cl. 117—160)

This invention relates to improved methods and materials for metallizing ceramics, and more particularly for metallizing ceramic bodies containing more than 90 weight percent of an oxide selected from the group consisting of aluminum oxide, beryllium oxide, and zirconium oxide.

Ceramic materials which contain more than 90 weight percent of an oxide selected from the group consisting of aluminum oxide, beryllium oxide, and zirconium oxide are widely used for those applications which require a material that will retain high structural strength at elevated temperatures. They are also used in applications which take advantage of other desirable ceramic characteristics, such as a low coefficient of expansion, a low electrical conductivity, and a low chemical reactivity. Beryllia ceramics are used when good heat conduction is desired. Pure aluminas with appropriate doping agents added have become important in various device applications in the form of ruby and sapphire, the former being used in lasers and the latter in making windows for high temperature devices. In many such applications, a method of making hermetic seals or a mechanically strong joint between two ceramic parts, or between a ceramic part and a metal part is desirable. Since ceramics generally do not form a strong bond directly to most metals, or to each other, the ceramic article is often prepared with an adherent metallic coating which can be utilized to bond the ceramic parts to each other or to metal parts. The process of providing such an adherent coating on a ceramic is known as metallizing.

Ceramic bodies have been metallized by sintering a coating of powdered metals, such as molybdenum and tungsten, to the surface of the body. However, this method is disadvantageous when applied to irregular contours or to the interiors of holes. Close control of the thickness of the coating is necessary in order to obtain consistent results with this method. Moreover, the results obtained with ceramics containing more than 96 weight percent alumina, such as sapphire or ruby, have often been unsatisfactory, because there is not sufficient interaction between the molybdenum and the ceramic.

Powders of insoluble molybdates and tungstates, or of oxides of molybdenum or tungsten, have been suspended in a binder, but these metallizing compositions have often been found unsatisfactory when applied to high alumina (over 96 weight percent $Al_2O_3$) ceramics such as ruby and sapphire.

An object of this invention is to provide an improved and easily controlled process for metallizing the surface of a ceramic body consisting of over 90 weight percent of an oxide selected from the group consisting of aluminum oxide, beryllium oxide, and zirconium oxide.

Another object of this invention is to provide a simple and inexpensive method of metallizing the surface of a ceramic body.

Another object of this invention is to provide an improved metallizing composition.

Still another object is to provide an improved method of coating the surface of a high alumina ceramic body with a uniform layer of molybdenum.

These and other objects of the invention are obtained by utilizing a metallizing composition of which the metallic portion is made up of 70–95 weight percent powdered molybdenum, balance or 30–5 weight percent powdered steatite, the powdered mixture being dispersed in a liquid mixture comprising an organic vehicle and an organic binder. The powdered molybdenum and powdered steatite are preferably fine enough to pass through a 400 mesh sieve. The exact relative proportions of the liquid and the powder are not critical, and may be widely varied.

The invention will be better understood from the following detailed description and the specific examples.

A particular metallizing composition may be prepared as follows. A quantity of reagent grade molybdenum trioxide is placed in a molybdenum furnace boat and heated in a closed furnace for about 24 hours at about 500° C. in an ambient of dry hydrogen. The furnace temperature is then raised to 750° C., and heating is continued for another 2 hours. The furnace is then cooled to room temperature. Clinkers of pure molybdenum metal are left in the furnace boat. The pure molybdenum metal clinkers are broken up in a corundum crucible, then ball-milled in an organic solvent such as amyl acetate for a sufficient time so that the dried product passes through a 400 mesh sieve.

A pure grade of steatite, consisting essentially of magnesium silicate, is fired in air at about 1300° C. for about one hour. The material is then cooled, and ball-milled in an organic solvent such as ethyl alcohol for about four hours, so that the dried product passes through a 400 mesh sieve.

The finely divided molybdenum metal is then mixed with the finely divided steatite in the proportion 70–95 weight percent powdered molybdenum and balance or 30–5 weight percent powdered steatite. In this example 80 grams of powdered molybdenum are mixed with 20 grams of powdered steatite.

Next, a binder is blended into the mixture. The binder is an organic compound, usually of high molecular weight, which increases the viscosity of a solution or dispersion. Many different binders are known to the art, such as methyl cellulose, carboxycellulose, polyvinyl alcohol, gum arabic, ethyl cellulose, isobutyl methacrylate, polyvinyl chloride, cellulose acetate-butyrate copolymers, polyvinyl chloride-acetate copolymers, polyesters, "Carbowax" (polyoxyethylene), nitrocellulose, and the like. In the metallizing composition of this example, about 2 to 7 grams of ethyl cellulose are utilized as a binder. The exact amount of binder utilized is not critical, and depends on the viscosity desired for the final product. A preferred lower limit for the amount of binder used is that amount which will give the final product the consistency of paint at room temperature. A preferred upper limit for the amount of binder mixed is that amount which will give the final product the consistency of honey at room temperature.

An organic vehicle, which is an organic solvent for the binder used is then blended into the mixture to form a dispersion of the desired viscosity. Many different organic vehicles are known to the art, including such solvents as methyl acetate, amyl acetate, acetone, xylene, toluene, "Cellosolve" or ethylene glycol dibutylether, benzene, isopropanol, cyclohexane, methylethyl ketone, and the like, as well as mixtures of these solvents. As a rough rule of thumb, the number of milliliters of the organic vehicle added is equal to the number of grams of powdered molybdenum and powdered steatite present. In this example, about 100 ml. of ethylene glycol dibutylether are added. The mixture is then blended in a three-roll mill. The viscosity of the metallizing solution thus prepared may be adjusted by blending in some more of the organic vehicle if it is too thick or blending in some more of the powdered steatite-molybdenum mixture if the solution is too thin.

The use of the above metallizing dispersion will now be described.

Example I

A ceramic body comprising about 95 weight percent beryllium oxide is dipped in a metallizing dispersion of which the metallic portion comprises a mixture of 70–95 weight percent powdered molybdenum and 30–5 weight percent powdered steatite dispersed in a liquid mixture comprising an organic vehicle and an organic binder, prepared as in the example described above. The body is then dried by any convenient method, for example by means of infrared lamps. Next, the ceramic body is fired in a reducing ambient for about one hour at a temperature of about 1550° C. to 1650° C. The furnace atmosphere may consist of line hydrogen, or of hydrogen-nitrogen mixtures known as forming gas. As a result of the firing step, an adherent coating of sintered molybdenum is formed on the ceramic body. The molybdenum coating may be utilized to form a bond with a metal body or with a similarly coated ceramic body. If desired, the molybdenum coating may be used as a base for the deposition of another metal or alloy, for example, by electroplating the molybdenum coating with the desired metal or alloy.

Example II

A ceramic body comprising about 95 weight percent zirconium oxide is painted or brushed on portions of its surface with a metallizing dispersion prepared as described above and comprising a mixture of 70–95 weight percent powdered molybdenum with balance (30–5 weight percent) powdered steatite dispersed in a liquid mixture comprising an organic vehicle and an organic binder. The body is dried by means of infrared lamps, then fired in a reducing ambient for about one hour at a temperature of about 1500° C. to 1700° C. A coating of sintered molybdenum is thereby formed over those portions of the ceramic body surface which were painted with the metallizing solution.

The fabrication of a hermetically sealed sapphire window will now be described.

Example III

A disc of transparent sapphire, which in this example, is a synthetic single crystal of pure alumina, is ground and polished on both major faces. Discs suitable for windows in various high-temperature devices are about ¾ to 3" in diameter, and about 50 to 250 mils thick. A screen of about 165 mesh or finer is positioned about 50 mils above the sapphire disc. If desired, selected areas of the screen may be blocked using photographic techniques known to the silk-screening art. A quantity of the metallizing composition, prepared as indicated above, is then poured on the screen, and a rubber roller or squeegee is passed over the screen. The metallizing composition is thereby forced through the unblocked portion of the screen onto the sapphire disc. The portion of the disc thus coated by the metallizing solution may, for example, be an outer zone about ¼" wide around the circumference of one face.

The metallizing composition on the disc is dried by means of infrared lamps, or by heating the disc in an oven for about 10 minutes at about 120° C. The disc is then placed on a sheet of molybdenum or tungsten which is loaded in a furnace boat of molybdenum-tungsten. The disc is fired in a reducing ambient for about one hour at a temperature of about 1450 to 1700° C. The reducing atmosphere may consist of hydrogen, line hydrogen, which contains a small amount of moisture, or wet forming gas, which is a mixture of 90 volume percent nitrogen and 10 volume percent hydrogen plus a small amount of moisture. The disc is then cooled to room temperature.

As a result of this firing step, the sapphire disc now has an adherent coating of sintered molybdenum on those portions of the disc corresponding to the unblocked portions of the screen. The electrical resistance of the coating thus formed is less than one ohm per square.

The sintered molybdenum coating may be used by itself to form a bond with a metal part or with a similarly coated ceramic part. Alternatively, the sintered molybdenum coating may be used as a base for the deposition of another metal. In this example, the sapphire disc is treated in a plating bath so as to deposit a coating of nickel about 0.1 to 0.2 mil thick upon the molybdenum-coated portion only of the disc. The disc is now bonded at its nickel-plated areas to either a metallized ceramic part, or to a metallic part, using brazes such as pure copper, silver-copper alloys such as 72 weight percent silver—28 weight percent copper, gold-nickel alloys, or the like.

The nickel-plated area of a sapphire disc thus metallized according to the invention can be brazed to metals such as molybdenum and the like, or to nickel-iron-cobalt alloys such as Kovar, Fernico, and even various steels, provided stress is relieved by means of a double braze.

Brazing is conveniently performed by holding the sapphire disc in a convenient jig, positioning the braze between the nickel-plated area on the disc and the part to which it is to be bonded, and heating the assemblage in a reducing ambient for about 3 to 5 minutes at a temperature a little above the melting point of the particular braze utilized. For the 72 silver—28 copper braze mentioned above, a temperature of 780° C. is required. When pure copper is used as a braze, a temperature of 1083° C. is required. Other high temperature brazes require furnace temperatures of about 900–1000° C. The reducing ambient in the furnace may be either pure dry hydrogen or line hydrogen when copper is utilized as the braze. On cooling, the brazed joint is ready for use, and the seal thus formed between the sapphire part and the metal or ceramic part to which it is bonded is hermetic in character. The flexural strength of a seal thus formed was found to be about 38,000 p.s.i., whereas the flexural strength of a similar seal, made according to the prior art with pure molybdenum powder as the metallizing agent was only about half this value.

There have thus been described improved metallizing compositions, and improved methods of metallizing ceramic bodies.

What is claimed is:

1. A composition of matter comprising a mixture of 70–95 weight percent powdered molybdenum and 30–5 weight percent powdered steatite dispersed in a liquid mixture comprising an organic vehicle and an organic binder.

2. A composition of matter comprising a mixture of 80 weight percent powdered molybdenum and 20 weight percent powdered steatite dispersed in a liquid mixture of ethylene glycol dibutyl ether and ethyl cellulose.

3. A method of meallizing ceramics comprising over 90 weight percent of an oxide selected from the group consisting of aluminum oxide, beryllium oxide, and zirconium oxide, comprising the steps of:
   (a) mixing powdered molybdenum and powdered steatite in the proportion 70–95 weight percent powdered molybdenum and 30–5 weight percent powdered steatite;
   (b) adding an organic binder and an organic vehicle in amount sufficient to form a fluid mixture;
   (c) applying the fluid mixture to the portion of the ceramic which is to be metallized; and,
   (d) firing the ceramic in a reducing atmosphere for about one hour at a temperature of about 1450° C. to 1700° C.

4. A method of metallizing ceramics comprising over 90 weight percent of an oxide selected from the group consisting of aluminum oxide, beryllium oxide, and zirconium oxide, comprising the steps of:
   (a) mixing powdered molybdenum and powdered steatite in the proportion 70–95 weight percent powdered molybdenum and 30–5 weight percent powdered steatite; said powdered steatite and said powdered molybdenum being fine enough to pass through a 400 mesh sieve;
(b) adding an organic binder and an organic vehicle in amount sufficient to form a fluid mixture;
(c) applying the fluid mixture to the portion of the ceramic which is to be metallized; and,
(d) firing the ceramic in a reducing atmosphere for about one hour at a temperature of about 1450° C. to 1700° C.

5. A method of metallizing ceramics comprising over 90 weight percent of an oxide selected from the group consisting of aluminum oxide, beryllium oxide, and zirconium oxide, comprising the steps of:
(a) mixing powdered molybdenum and powdered steatite in the proportion 70–95 weight percent powdered molybdenum and 30–5 weight percent powdered steatite;
(b) adding an organic binder and an organic vehicle in amount sufficient to form a fluid mixture having a consistency varying from the consistency of paint to the consistency of honey;
(c) applying the fluid mixture to the portion of the ceramic which is to be metallized; and,
(d) firing the ceramic in a reducing atmosphere for about one hour at a temperature of about 1450° C. to 1700° C.

6. A method of metallizing sapphire, comprising the steps of:
(a) mixing powdered molybdenum and powdered steatite in the proportion 70–95 weight percent powdered molybdenum and 30–5 weight percent powdered steatite;
(b) adding an organic binder and an organic vehicle in amount sufficient to form a fluid mixture;
(c) applying the fluid mixture to the portion of the sapphire which is to be metallized; and,
(d) firing the sapphire in a reducing atmosphere for about one hour at a temperautre of about 1450° C. to 1700° C.

References Cited by the Examiner
UNITED STATES PATENTS

| | | | |
|---|---|---|---|
| 2,667,427 | 1/1954 | Nolte | 117—71 X |
| 2,835,967 | 5/1958 | Umblia | 29—473.1 X |
| 2,903,788 | 9/1959 | Pryslak | 117—227 X |
| 2,996,401 | 8/1961 | Welch et al. | 117—123 X |
| 3,006,069 | 10/1961 | Rhoads et al. | 29—473.1 |

ALFRED L. LEAVITT, *Primary Examiner.*

RICHARD D. NEVIUS, J. R. BATTEN, JR.,
*Assistant Examiners.*